(12) United States Patent
Monny Dimouamoua

(10) Patent No.: US 7,554,057 B2
(45) Date of Patent: Jun. 30, 2009

(54) MODULAR OVEN FOR CEREAL-PASTE BASED FOODSTUFFS

(75) Inventor: Martin Monny Dimouamoua, Viry Chatillon (FR)

(73) Assignee: Generale Biscuit (FR)

( * ) Notice: Subject to any disclaimer, the term of this patent is extended or adjusted under 35 U.S.C. 154(b) by 757 days.

(21) Appl. No.: 10/528,921

(22) PCT Filed: Aug. 12, 2003

(86) PCT No.: PCT/FR03/02513
§ 371 (c)(1),
(2), (4) Date: Mar. 23, 2005

(87) PCT Pub. No.: WO2004/026034
PCT Pub. Date: Apr. 1, 2004

(65) Prior Publication Data
US 2006/0118099 A1   Jun. 8, 2006

(30) Foreign Application Priority Data
Sep. 23, 2002  (FR) ................... 02 11727

(51) Int. Cl.
| | |
|---|---|
| *A21B 1/14* | (2006.01) |
| *A21B 1/26* | (2006.01) |
| *A21B 1/48* | (2006.01) |
| *A21B 3/04* | (2006.01) |
| *F27B 9/24* | (2006.01) |
| *F27B 9/36* | (2006.01) |

(52) U.S. Cl. ............... 219/388; 219/400; 219/401; 219/404; 219/411; 99/443 C; 99/476; 432/128; 432/133; 432/147

(58) Field of Classification Search .............. None
See application file for complete search history.

(56) References Cited

U.S. PATENT DOCUMENTS

| | | | | |
|---|---|---|---|---|
| 2,704,040 | A | * 3/1955 | Warrington | ............ 432/133 |
| 3,304,406 | A | * 2/1967 | King | ............ 219/411 |
| 3,908,533 | A | 9/1975 | Fagerstrom et al. | |
| 4,167,585 | A | * 9/1979 | Caridis et al. | ............ 426/233 |
| 4,389,562 | A | * 6/1983 | Chaudoir | ............ 219/388 |
| 4,473,004 | A | 9/1984 | Wells et al. | |
| 4,479,776 | A | 10/1984 | Smith | |
| 4,751,877 | A | 6/1988 | Andersson | |

(Continued)

FOREIGN PATENT DOCUMENTS

EP    0 859 199 A   8/1998

(Continued)

*Primary Examiner*—Joseph M Pelham
(74) *Attorney, Agent, or Firm*—Alston & Bird LLP (57) ABSTRACT

The invention relates to a modular oven for food products, the oven including a conveyor device for entraining the products from an inlet to an outlet of the oven, and comprising in cascade at least two, and preferably three, individual modules, each individual module presenting: a ceiling of adjustable height that presents first air and/or steam injection means for generating forced convection; a floor of adjustable height that presents second air and/or steam injection means for generating forced convection; floor burners for baking by convection, which burners are disposed between the floor and the conveyor device and are adjustable vertical position; and ceiling burners for baking by radiation, which burners are disposed between the conveyor device and the ceiling, and are adjustable in vertical position.

6 Claims, 6 Drawing Sheets

U.S. PATENT DOCUMENTS

| | | |
|---|---|---|
| 5,075,120 A | 12/1991 | Leary et al. |
| 5,345,061 A * | 9/1994 | Chanasyk et al. ............ 219/388 |
| 5,934,178 A * | 8/1999 | Caridis et al. ................. 99/330 |
| 6,595,117 B1 * | 7/2003 | Jones et al. .................... 99/386 |
| 7,307,243 B2 * | 12/2007 | Farkas et al. ................ 219/388 |

FOREIGN PATENT DOCUMENTS

| | | |
|---|---|---|
| FR | 752 087 A | 9/1933 |
| FR | 967 192 A | 10/1950 |
| WO | WO 89/00393 A | 1/1989 |
| WO | WO 01/80649 A | 11/2001 |

* cited by examiner

MODULAR OVEN FOR CEREAL-PASTE BASED FOODSTUFFS

BACKGROUND OF THE INVENTION

The ovens used for baking food products based on a cereal paste vary depending on the specific type of product to be baked. At present there does not exist any standard oven suitable for baking all the types of product in satisfactory manner.

Thus, for crackers, and for soft items such as sponge, it is general practice to use direct gas flame (DGF) ovens.

For pastes from rotary machines or pastes that are extruded and cut to length, cyclothermal or forced-convection ovens are used, in addition to DGF ovens.

Nevertheless, best baking results can be obtained only by using DGF ovens for crackers and soft items, and cyclothermal or forced-convection ovens for-rotary-machine or cut pastes, with the precise configuration of each oven being adjusted in practically unalterable manner for each type of paste.

As presently designed, DGF ovens suffer from drawbacks such as:
possible pollution of food by combustion products;
difficulties in regulating baking; and finally
problems of burner maintenance. For example, with Venturi type burners, it is possible for heat flux to get back to the burner, which can damage it, if poorly dimensioned.

With forced convection in present ovens, the energy conveyed by the flow of hot air is dissipated essentially in the form of a convective flux.

At a higher temperature, the energy could be dissipated, in addition or mainly, as radiant flux. This depends on temperature, on flow rate, and on flow speed.

With forced convection, there does not exist any oven in which the temperature of the baking chamber can reach temperatures in the range 350° C. to 400° C. with air at a speed that is less than or equal to 0.5 meters per second (m/s). Unfortunately, that is what is required to obtain a significant radiant flux for baking certain "soda" crackers. Furthermore, the speeds needed in present ovens lie in the range 3 m/s to 6 m/s (at the outlet from the nozzle). Unfortunately, such speeds do not enable light items to be baked since they are blown away by the flow of air inside the oven.

There also exist "impingement" ovens which are forced-convection ovens with air speeds not less than 20 m/s.

Nor do there exist any combined DGF and forced-convection ovens in which it is possible within a single module to modulate, in controlled manner, the quantities of energy supplied by each of those two modes.

OBJECTS AND SUMMARY OF THE INVENTION

The present invention seeks to provide an oven making it possible to mitigate at least one of the above-listed drawbacks, and also to exceed the limitations of all kinds of present oven by enabling a manufacturer to adjust optimally the types of energy that are supplied: DGF, and forced-convection with radiant flux and/or convective flux; and also to make certain innovations possible concerning food products, or to use a single pilot oven to simulate baking in a variety of different industrial ovens.

The invention thus provides a modular oven for food products, the oven including a conveyor device for entraining products from an inlet to an outlet of the oven, and comprising in cascade at least two, and preferably three, individual interchangeable modules, each individual module presenting:
a ceiling of adjustable height that presents first air and/or steam injection means to generate forced convection;
a floor of adjustable height that presents second air and/or steam injection means for generating forced convection;
floor burners for baking by convection, which burners are disposed between the floor and the conveyor device and are of adjustable vertical position; and
ceiling burners for baking by radiation, which burners are disposed between the conveyor device and the ceiling, and are adjustable in vertical position. The ceiling burners may also be separated from the baking chamber by a screen to simulate indirect baking.

In each individual module, the ceiling and/or the floor may be adjustable in height between at least a high position and a low position, and possibly also a middle position intermediate between the high and low positions.

The drive device may be self-propelled. It may be decoupled from the modules. It may be reversible (capable of operating in both directions). It includes a conveyor belt that is solid or gridded, possibly of variable width. The belt may be made of metal, of plastics material, of glass fiber, or of other materials.

In each individual module, the floor burners and/or the ceiling burners may be adjustable in height between at least a high position and a low position, optionally with a middle position intermediate between the high and low positions. The burners may also be pointable in any direction.

The invention also provides a method of using a modular oven as defined above for baking biscuits or cookies, wherein the oven comprises three individual modules in cascade, with the first module being used to perform a pre-baking and/or rising step, with the second module being used to perform a baking step, and with the third module being used to perform a step of browning and/or drying and/or cooling the product.

In a first variant, to manufacture crackers from a paste of conventional composition, the method implements:
a gridded conveyor belt, e.g. of the Ashworth type;
in the first module, positioning the ceiling and the floor in their high positions and putting the floor burners into operation, which burners are thus closer to the conveyor device, such that the radiant and the conductive flux is increased;
in the second module, positioning the ceiling in the low position and the floor in the high position and injecting air through the ceiling and the floor to obtain increased convective flux; and
in the third module, positioning the ceiling and the ceiling burners in the low position and actuating the ceiling burners to form radiant flux for browning the products and for drying them.

In a second variant, to manufacture sponge from a paste of conventional composition, the method implements:
a solid conveyor belt;
in the first module, positioning the ceiling and the floor in their high positions and operating the floor burners, which are thus in their high position as close as possible to the conveyor device such that the conductive flux is increased possibly with superheated steam being delivered, e.g. at 350° C.-400° C.;
in the second module, positioning the ceiling burners and the floor burners in their low positions and actuating said burners to obtain combined baking both by natural convection (without injecting air through the nozzles) and increased radiation by lowering the ceiling; and in the third module, positioning the ceiling in the high position and the floor in the high position and injecting hot air through the ceiling and through the floor to achieve drying by forced convection.

In a third variant, to manufacture a dry laminated biscuit or cookie from a paste of known type, e.g. to manufacture a "PRINCE" type biscuit as sold by the supplier LU France, the method implements:

in the first module, positioning the ceiling and the floor in middle positions intermediate between said high and low positions, and positioning the ceiling and floor burners in middle positions intermediate between said high and low positions, and actuating said burners with air being injected through the ceiling, to encourage heating by radiation while maintaining a convective flux at a value that is sufficiently low to avoid excessively heating the core of the product and to avoid delamination;

in the second module, positioning the ceiling in the low position and the floor in the high position, positioning the ceiling burners in the low position and the floor burners in the high position, and actuating the burners together while injecting air through the floor to increase conductive flux; and in the third module, using the same parameters as for the first module, to brown and dry the product.

In a fourth variant, to manufacture a product from a paste that is delivered in the form of individual unbaked moldings from a rotary machine, said paste being of known composition (which is generally relatively fatty to be unmoldable in a rotary machine provided with molding recesses), the method implements:

in the first module, positioning the ceiling and the floor in middle positions intermediate between said high and low positions, and the ceiling and floor burners in middle positions intermediate between said high and low positions, and actuating solely air injection through the ceiling and the floor, to encourage heating by convection;

in the second module, positioning the ceiling and the ceiling burners in the high position, positioning the floor and the floor burners in the high position, and actuating air injection through the ceiling and the floor to encourage heating by convection; and in the third module, repeating the same settings as for the first module.

In a fifth variant, for baking a paste deposited in the form of individual pieces, in particular by extrusion and cutting, the method implements:

in the first module, positioning the ceiling and the floor in middle positions intermediate between said high and low positions, and positioning the ceiling burners in middle positions intermediate between said high and low positions, and actuating the ceiling burners in such a manner as to control the spreading of the paste without heating it excessively, by combined radiant and conductive heating;

in the second module, positioning the ceiling and the floor in said middle position, and the floor burners in the middle position, to increase the total energy flux; and in the third module, positioning the floor in its high position, and the floor burners in the middle position, to obtain drying by entrainment (as opposed to drying by boiling) and also positioning the ceiling in the low position and the ceiling burners in the middle position to encourage browning.

BRIEF DESCRIPTION OF THE DRAWINGS

Other characteristics and advantages of the invention appear better on reading the following description given by way of non-limiting example and with reference to the drawings, in which.

MORE DETAILED DESCRIPTION

Figure 1:
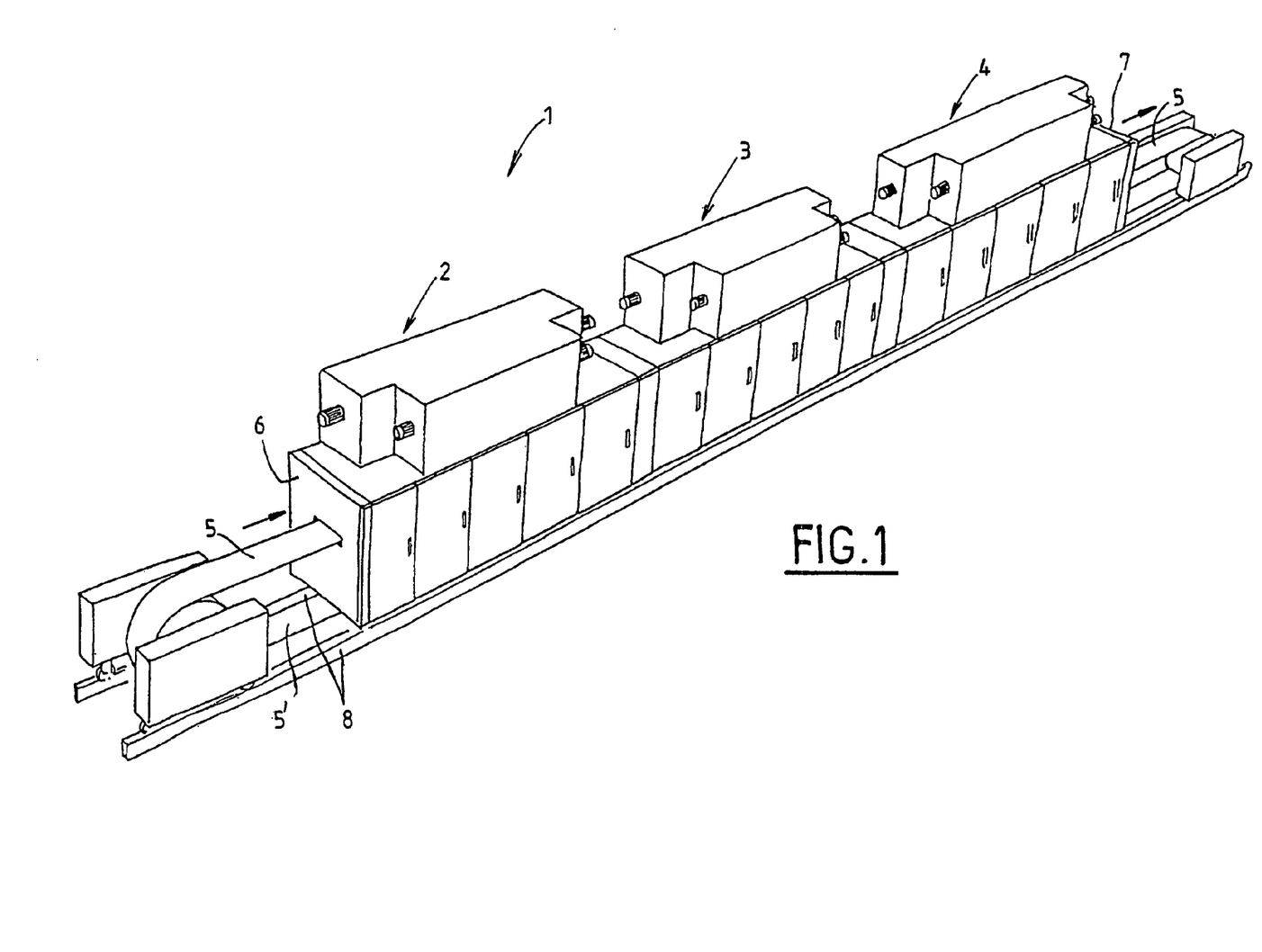
FIGS. 1 to 3 are perspective views of a modular oven of the invention, with one of the modules being shown partially cut away in FIGS. 2 and 3.

FIG. 1 shows a modular oven presenting in cascade three modules successively referenced 2, 3, and 4, lying between an inlet 6 and an outlet 7, for products that are conveyed by a conveyor belt 5 which is advantageously the same belt for all three modules. As shown in FIG. 1, the conveyor belt 5 has a return strand 5' beneath the modules which are standing on rails 8. The conveyor belt 5 is advantageously reversible.

Figure 2:
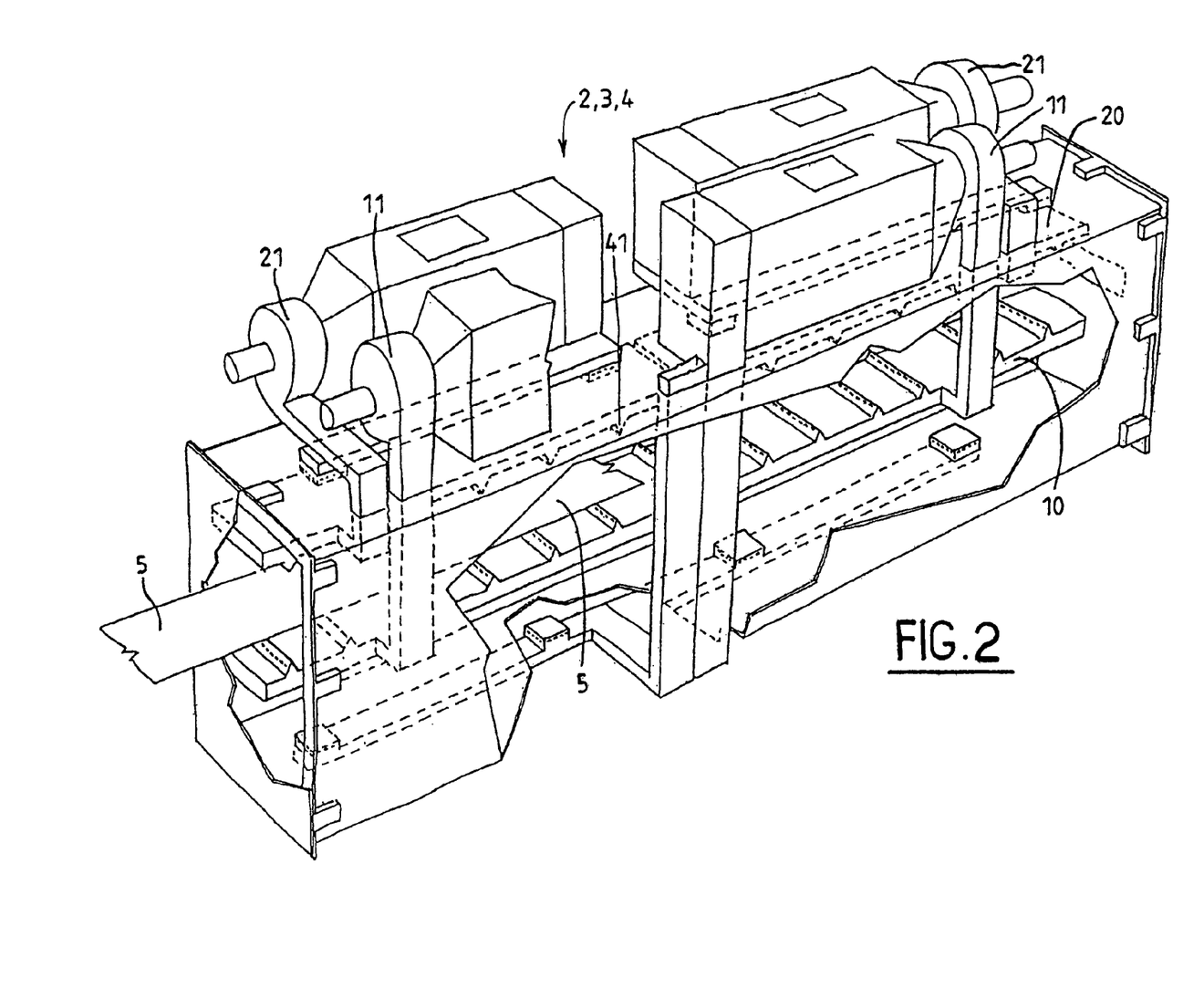

As shown in FIG. 2, each module presents a floor 10 situated beneath the conveyor belt 5 and that is adjustable in height, and also a ceiling 20 situated above the belt 5 and that is adjustable in height. Blowers 11 and 21 enable hot air and/or steam to be blown through the floor and/or the ceiling to provide heating by forced convection through the ceiling and/or the floor. Air speeds at the outlets from the nozzles lie in the range 0.5 m/s to 50 m/s.

Figure 3:
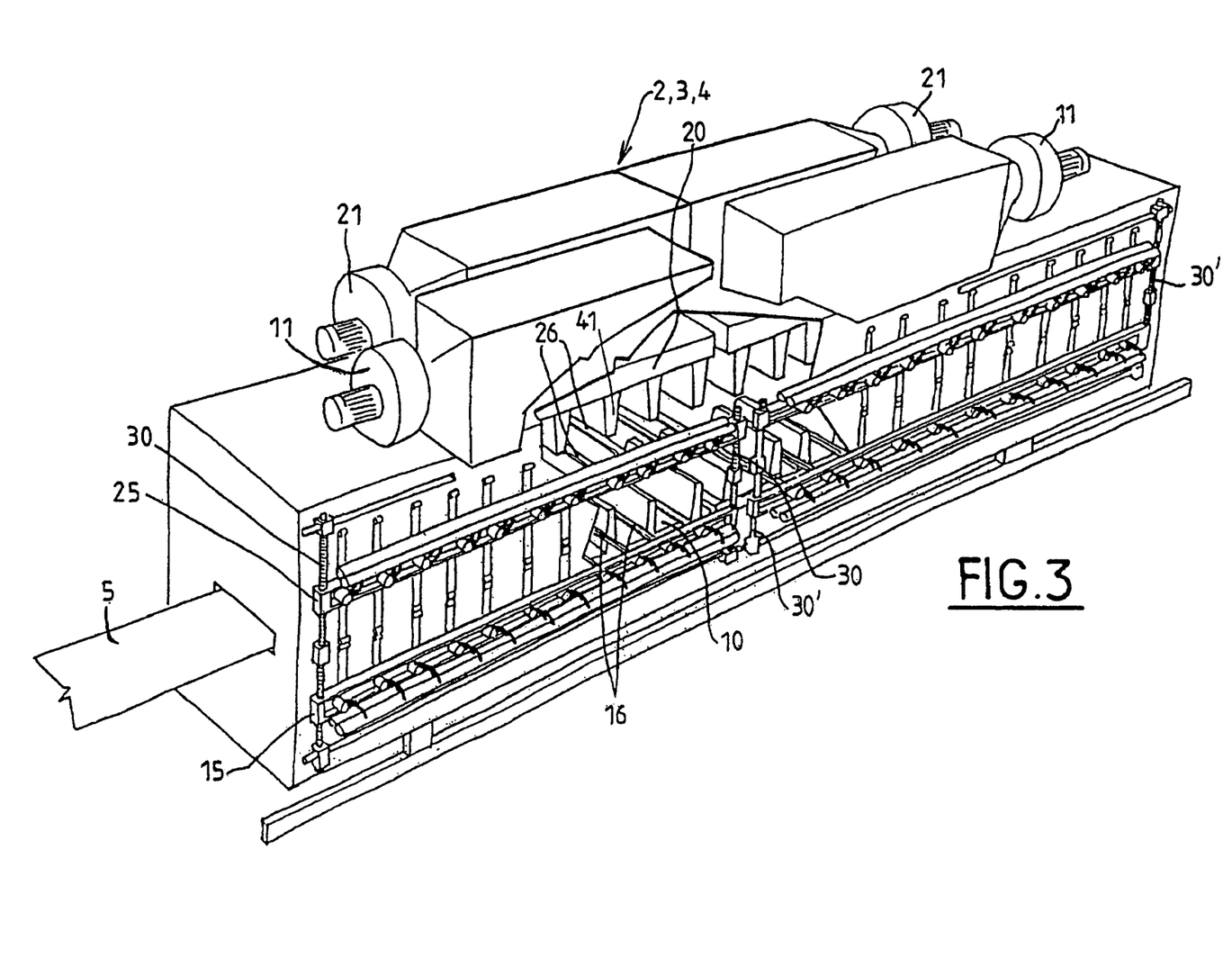

FIG. 3 shows floor burner strips 15 situated between the floor 10 and the belt 5, and ceiling burner strips 25 situated between the ceiling 20 and the belt 5. The vertical positions of the burner strips 15 and 25 are independently adjustable using a rack device which enables adjustment to be fine to adjust the solid angle between the burners 40 and the products being baked. Such rack devices. serve to move burner-carrying rails vertically.

Two such rack devices 30 and 30' are shown, giving additional latitude concerning the possibility of using two different vertical positions, one in the upstream or first half of a module, and the other in the downstream or second half of the same module.

The burners 40 are placed in adjustable positions along horizontal rails 16 for the floor burners and 26 for the ceiling burners. On each of these rails, the burners 40 can be added, moved, withdrawn, activated, and/or deactivated in individual manner. The configuration of the burners 40 can thus be adapted along a vertical axis. The number of burners may be greater than in a conventional installation.

Figure 4:
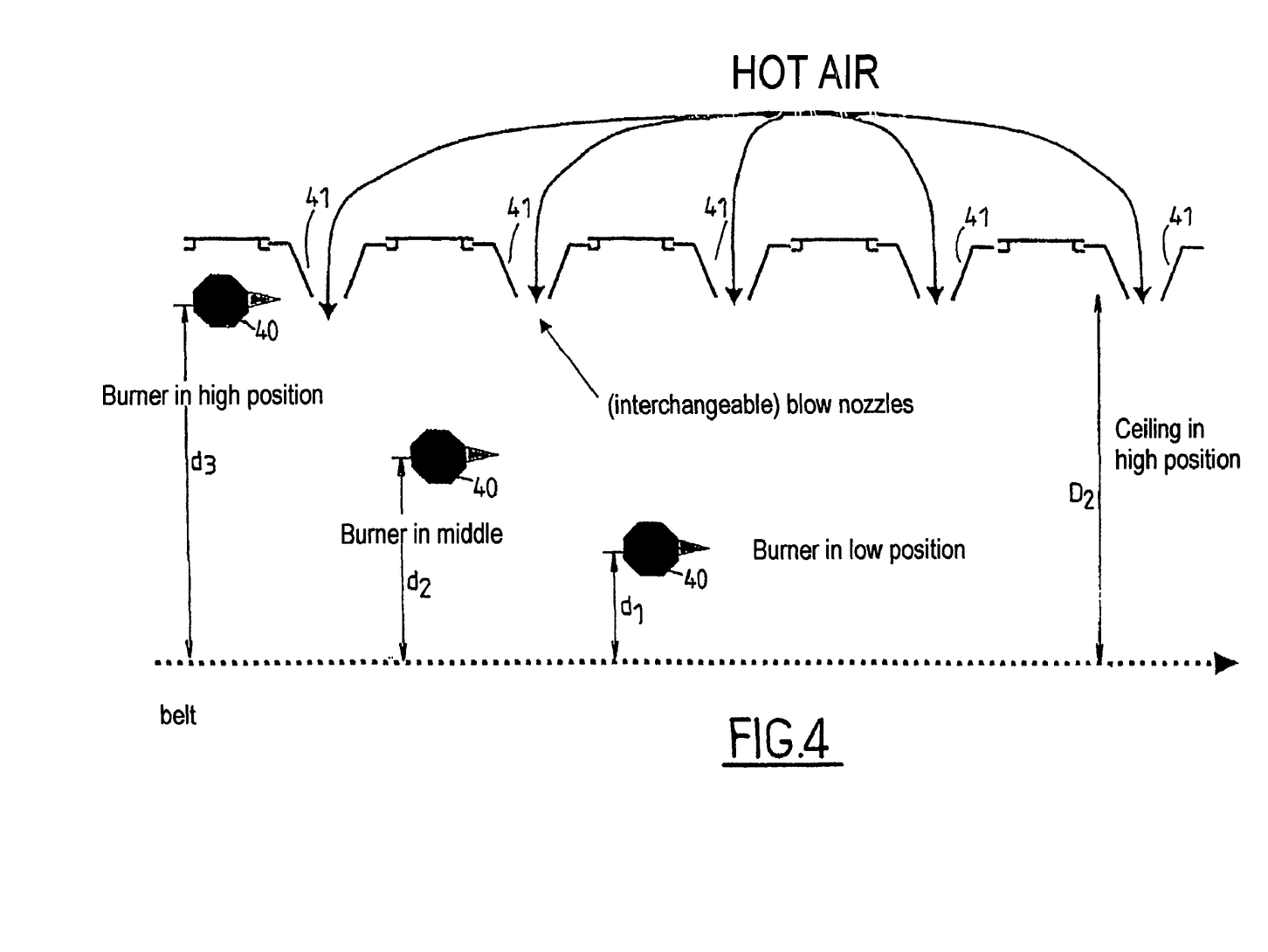
FIGS. 4 to 6 show various possible configurations relating to the ceiling and the ceiling burners.

As shown in FIG. 4, when the ceiling 20 is in its high position (e.g. $D_2$=500 millimeters (mm)), the burners 40 may be in a high position (e.g. $d_3$=500 mm) or in a low position ($d_1$=100 mm), or possibly in an intermediate position (e.g. $d_2$=250 mm).

Figure 5:
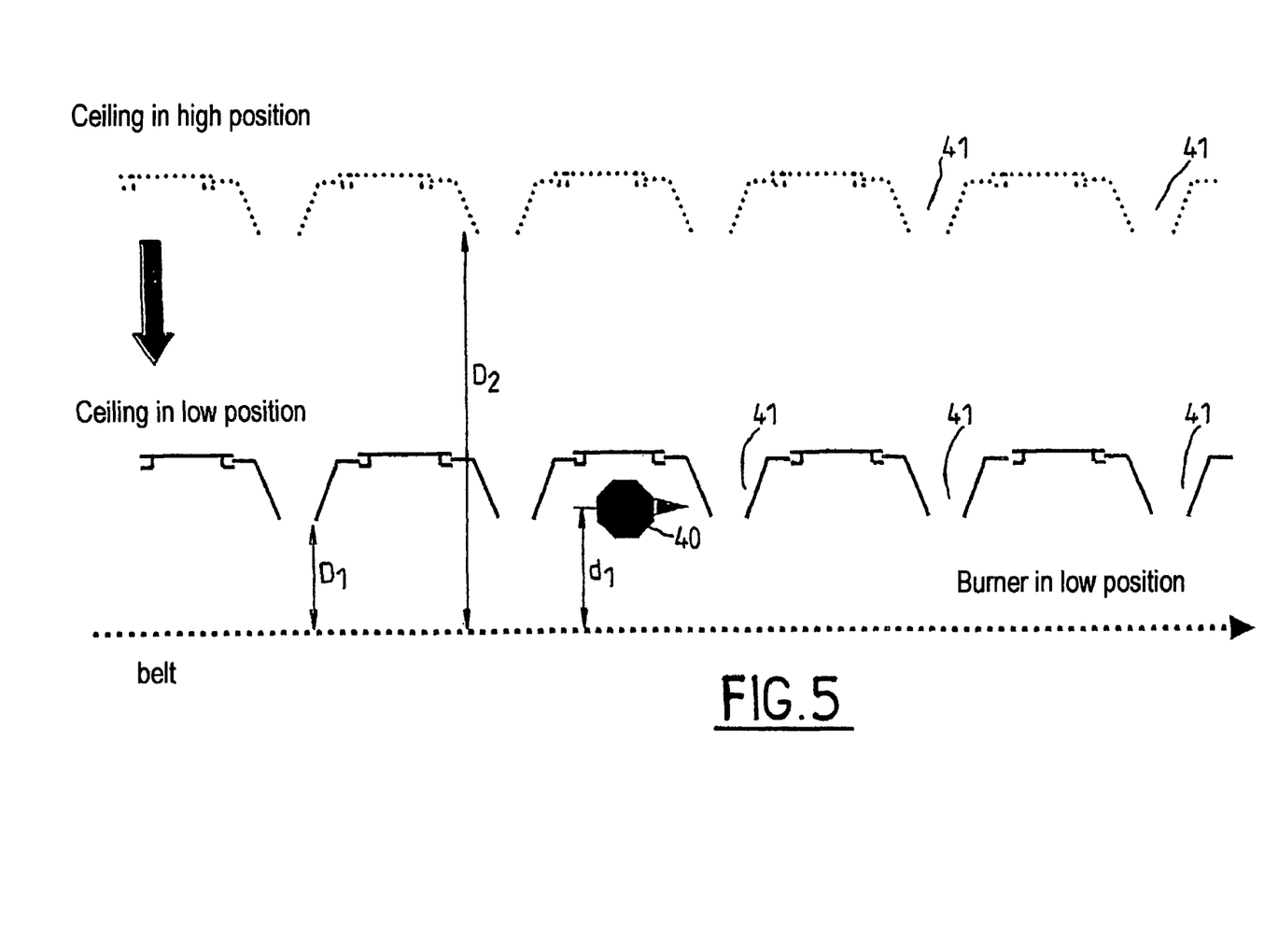

As shown in FIG. 5, when the ceiling 20 is in the low position (e.g. $D_1$=100 mm), the ceiling burners 40 can occupy only their low position ($d_1$=100 mm, for example). When the ceiling 20 is in its intermediate position, the burners 40 can occupy only their intermediate or low positions.

Figure 6:
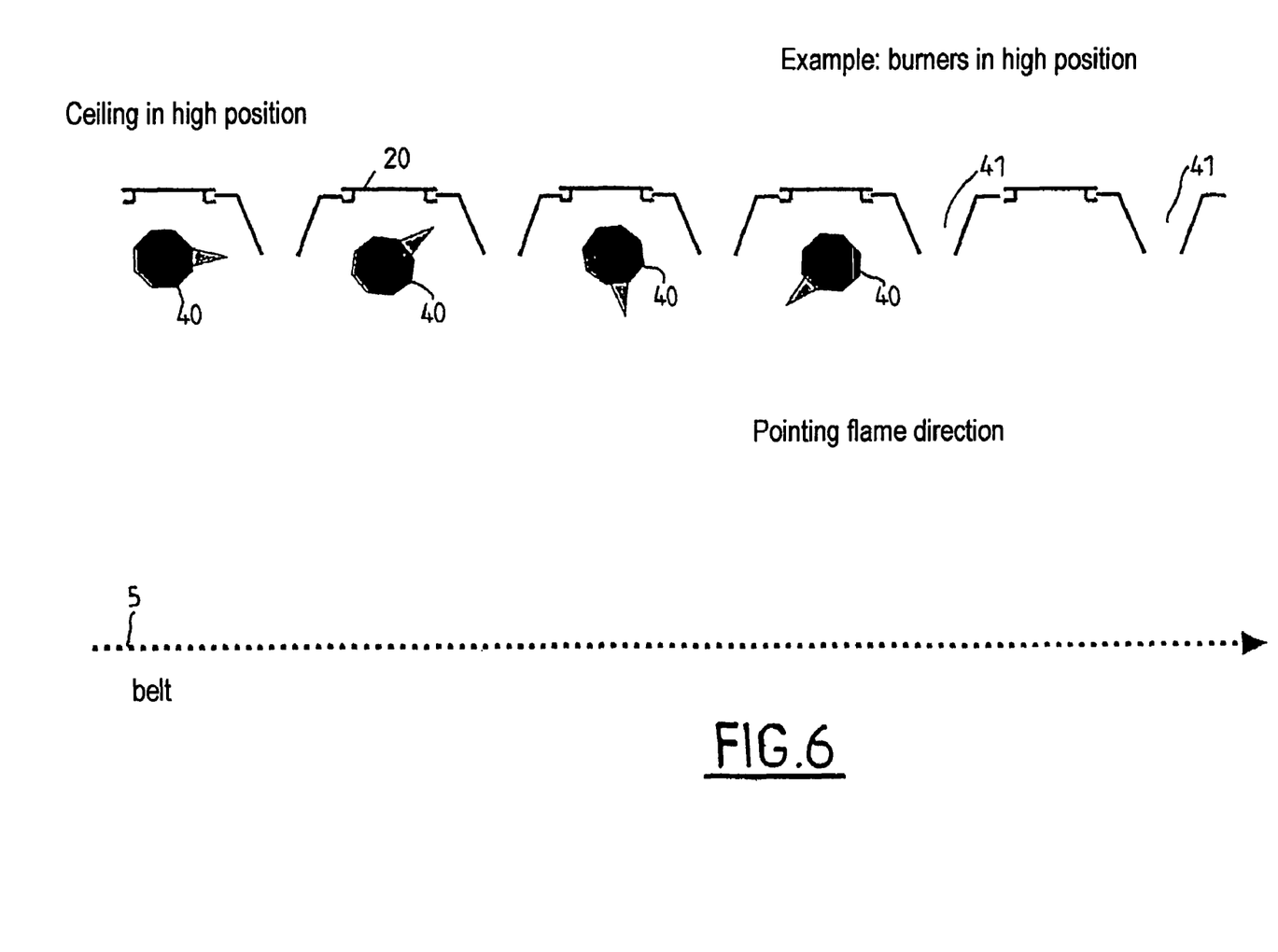

FIG. 6 shows the option for varying the direction in which the flames of the burners 40 point when the burners are in the high position. Such adjustable pointing is naturally also possible when the burners are in the middle or low positions.

The floor 10 and the floor burners 40 can also be adjusted in height, in positions that are mirror images of the above-described positions about the conveyor belt 5. The conditions concerning the possible positions for the floor and the floor burners are the same as for the ceiling and the ceiling burners, taking account of the "mirror" effect about the belt 5 (in other words the terms "high" and "low" are interchanged).

The forced convection of hot air and/or steam through nozzles 41 (which may be of various shapes) in the ceiling 20 and/or the floor 10 may have the following characteristics: speed at nozzle outlet lying in the range 0.5 m/s to 15 m/s, and temperature lying in the range 50° C. to 400° C.

The oven may also be associated with modules for heating by means of electromagnetic waves. The modules may also be used in a cooling mode by replacing hot air injection with injection of air that is cold and dry.

What is claimed is:

1. A modular oven for food products, the oven including a self-propelled conveyor device for entraining products from an inlet to an outlet of the oven, and comprising in cascade at least two individual interchangeable modules, each individual module presenting:

a ceiling of adjustable height that presents first air and/or steam injection means to generate forced convection;

a floor of adjustable height that presents second air and/or steam injection means for generating forced convection;

floor burners for baking by convection, which burners are disposed between the floor and the conveyor device and are of adjustable vertical position; and ceiling burners for baking by radiation, which burners are disposed between the conveyor device and the ceiling, and are adjustable in vertical position and in pointing direction.

2. A modular oven according to claim 1, wherein in each individual module the ceiling is adjustable at least between a high position and a low position.

3. A modular oven according to claim 1, wherein in each individual module the floor is adjustable between at least a high position and a low position.

4. A modular oven according to claim 1, wherein the floor burners are adjustable between at least a high position and a low position, and are pointable in any direction.

5. A modular oven according to claim 1, wherein the ceiling burners are adjustable between at least a high position and a low position, and are pointable in any direction.

6. A modular oven according to claim 1, wherein the burners are pointable.

* * * * *